United States Patent
Fujita et al.

(10) Patent No.: US 7,129,660 B2
(45) Date of Patent: Oct. 31, 2006

(54) MOTOR-TEMPERATURE ESTIMATION APPARATUS AND MOTOR CONTROL APPARATUS

(75) Inventors: Shuji Fujita, Nishikamo-gun (JP); Atsuo Sakai, Okazaki (JP)

(73) Assignees: Toyota Jidosha Kabushiki Kaisha, Toyota (JP); Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/508,249

(22) PCT Filed: Mar. 18, 2003

(86) PCT No.: PCT/JP03/03219

§ 371 (c)(1),
(2), (4) Date: Oct. 4, 2004

(87) PCT Pub. No.: WO03/079535

PCT Pub. Date: Sep. 25, 2003

(65) Prior Publication Data

US 2005/0242760 A1      Nov. 3, 2005

(30) Foreign Application Priority Data

Mar. 20, 2002   (JP) .............................. 2002-078928

(51) Int. Cl.
| H02K 17/32 | (2006.01) |
| H02K 23/68 | (2006.01) |
| H02K 27/30 | (2006.01) |
| H02P 7/00  | (2006.01) |

(52) U.S. Cl. ...................... 318/434; 318/432; 318/471; 318/472; 318/480

(58) Field of Classification Search ................ 318/434, 318/432, 471, 472, 480
See application file for complete search history.

(56) References Cited

U.S. PATENT DOCUMENTS

| 5,086,862 A  | * | 2/1992  | Graber et al.    | 180/422 |
| 6,246,197 B1 | * | 6/2001  | Kurishige et al. | 318/432 |
| 6,334,503 B1 | * | 1/2002  | Fukumura et al.  | 180/446 |
| 6,380,706 B1 | * | 4/2002  | Kifuku et al.    | 318/434 |
| 2004/0249525 A1 | * | 12/2004 | Okoshi et al. | 701/22  |
| 2005/0205344 A1 | * | 9/2005  | Uryu          | 180/446 |

FOREIGN PATENT DOCUMENTS

CN           2178014 Y       9/1994

(Continued)

*Primary Examiner*—Lincoln Donovan
*Assistant Examiner*—Erick Glass
(74) *Attorney, Agent, or Firm*—Oliff & Berridge, PLC (57) ABSTRACT

A motor-current square value calculation section 45 calculates, as a motor-current square value, the sum of respective square values of two phase currents converted from three phase currents flowing through an electric motor. A temperature estimation calculation section 44 performs low-pass filtering for the motor-current square value, and calculates temperature increases of the mass portion and coils on the basis of the filtered motor-current square value. In the low-pass filtering, filtering calculation is performed in a manner which changes depending on rotational speed RV of the electric motor; i.e., whether the electric motor is in a rotating state or in a stopped state. The temperature increase of the mass portion is added to ambient temperature of the electric motor to thereby estimate temperature of the mass portion, and the temperature increase of the coils is added to the estimated temperature of the mass portion to thereby estimate temperature of the coils. Accordingly, the coil temperature of the electric motor can be accurately detected, and current flowing through the electric motor is properly controlled in accordance with the detected temperature.

22 Claims, 6 Drawing Sheets

FOREIGN PATENT DOCUMENTS

| | | |
|---|---|---|
| JP | A 4-71379 | 3/1992 |
| JP | A 8-127351 | 5/1996 |
| JP | A 8-133107 | 5/1996 |
| JP | A 10-67335 | 3/1998 |

* cited by examiner

MOTOR-TEMPERATURE ESTIMATION APPARATUS AND MOTOR CONTROL APPARATUS

TECHNICAL FIELD

The present invention relates to a motor-temperature estimation apparatus for estimating temperature of the housing, stator, coils, or the like of an electric motor, and to a motor control apparatus capable of limiting current flowing through an electric motor in accordance with coil temperature of the motor estimated by use of the motor-temperature estimation apparatus.

BACKGROUND ART

As shown in Japanese Patent Application Laid-Open (kokai) No. H10-67335, a conventional apparatus includes a temperature sensor provided within an electric motor, and corrects drive current on the basis of temperature detected by use of the temperature sensor, to thereby compensate drop in permeability of the stator of the motor stemming from temperature increase. Further, in the publication, there is proposed a technique of estimating temperature of an electric motor through integration of drive current flowing through the motor.

The above-described technique which uses a temperature sensor incorporated in an electric motor is not preferable from the viewpoint of cost and easiness of mounting of the motor onto an apparatus which uses the motor, because of the necessity of providing a temperature sensor and connection wires for connecting the temperature sensor and a control circuit of the motor. Although the above-mentioned patent publication proposes a technique of estimating temperature of an electric motor through integration of drive current flowing through the motor, it does not describe the details of the technique.

DISCLOSURE OF THE INVENTION

The present invention has been accomplished in order to cope with the above-described problem, and an object of the present invention is to provide a motor-temperature estimation apparatus which can accurately detect temperature of the housing, stator, coils, or the like of an electric motor, without the necessity of incorporating a temperature sensor into the motor. Another object of the present invention is to provide a motor control apparatus which can limit current flowing through an electric motor in accordance with coil temperature of the motor estimated by use of the motor-temperature estimation apparatus, to thereby reliably suppress temperature rise of the coils of the motor.

In order to achieve the above object, the present invention includes, as characteristic features, current detection means for detecting current flowing through a coil of an electric motor; determination means for determining whether the electric motor is in a rotating state or in a stopped state; and estimation calculation means for estimatingly calculating temperature of the electric motor on the basis of the detected current and through calculation which changes depending on results of the determination as to whether the electric motor is in the rotating state or in the stopped state. In this case, the temperature of the electric motor refers to, for example, temperature of a housing, temperature of a stator, or temperature of the coil.

The estimation calculation means preferably includes square value calculation means for calculating a square value of the detected current; low-pass-filtering means for performing low-pass-filtering calculation for the calculated square value in a manner which changes depending on results of the determination as to whether the electric motor is in the rotating state or in the stopped state; temperature increase calculation means for calculating a temperature increase stemming from current flowing through the coil on the basis of the low-pass-filtered square value; and temperature calculation means for calculating temperature of the electric motor on the basis of the calculated temperature increase.

More specifically, the low-pass filtering delays (in other words, smoothes) change in the current square value (a parameter corresponding to quantity of generated heat). Preferably, when the electric motor is in the stopped state, change in the current square value is rendered sharp; i.e., delay of change is reduced, as compared with the case where the electric motor is in the rotating state. Further, the temperature calculation means may calculate temperature of the electric motor through addition, to ambient temperature of the electric motor, of the temperature increase calculated by means of the temperature increase calculation means.

In the case where such a motor temperature estimation apparatus is applied to a three-phase motor, the motor temperature estimation apparatus may be configured in such a manner that the current detection means detects two phase currents converted from three phase currents; and the estimation calculation means estimatingly calculates temperature of the electric motor on the basis of the sum of respective square values of the two phase currents. Alternatively, the motor temperature estimation apparatus may be configured in such a manner that the current detection means detects three phase currents, and the estimation calculation means estimatingly calculates temperature of the electric motor on the basis of respective square values of the three phase currents.

Under the present invention having the above-described structural features, temperature of the electric motor is estimated through calculation which changes depending on results of the determination by the determination means as to whether the electric motor is in the rotating state or in the stopped state. In an electric motor, temperature increase caused by current flowing through the coil in a stopped state (rotation restrained state) is greater than temperature increase caused by current flowing through the coil in a rotating state. Therefore, according to the present invention, the difference in temperature increase caused by current flowing through the coil between the rotating state and the stopped state is taken into consideration, and thus estimation of temperature of the electric motor can be performed accurately. As a result, without necessity of incorporating a temperature sensor in the electric motor, various controls on the basis of temperature of the electric motor, such as limiting of coil current and correction of decrease in permeability of the stator caused by temperature increase, can be performed by means of a simple configuration.

Another feature of the present invention resides in a motor control apparatus comprising current limiting means for limiting current flowing through the electric motor in accordance with the coil temperature estimated by means of the motor temperature estimation apparatus, which is configured as described above. By virtue of this configuration, current flowing through the electric motor is limited in accordance with the coil temperature detected with high accuracy, whereby temperature increase of the coil of the electric motor can be securely suppressed.

In this case, the current limit means may be configured to limit current flowing through the electric motor to a predetermined limit value or less, when the estimated coil temperature exceeds a predetermined temperature. By virtue of this configuration, current flowing through the electric motor is forcedly limited to the limit value or less, whereby temperature increase of the coil of the electric motor can be reliably suppressed.

Moreover, when current flowing through the electric motor is limited to the limit value or less, preferably, the limit value is gradually changed. By virtue of this configuration, even when coil temperature changes abruptly, current flowing through the electric motor changes gradually, whereby abrupt change in output of the electric motor can be avoided.

BEST MODE FOR CARRYING OUT THE INVENTION

Figure 1:
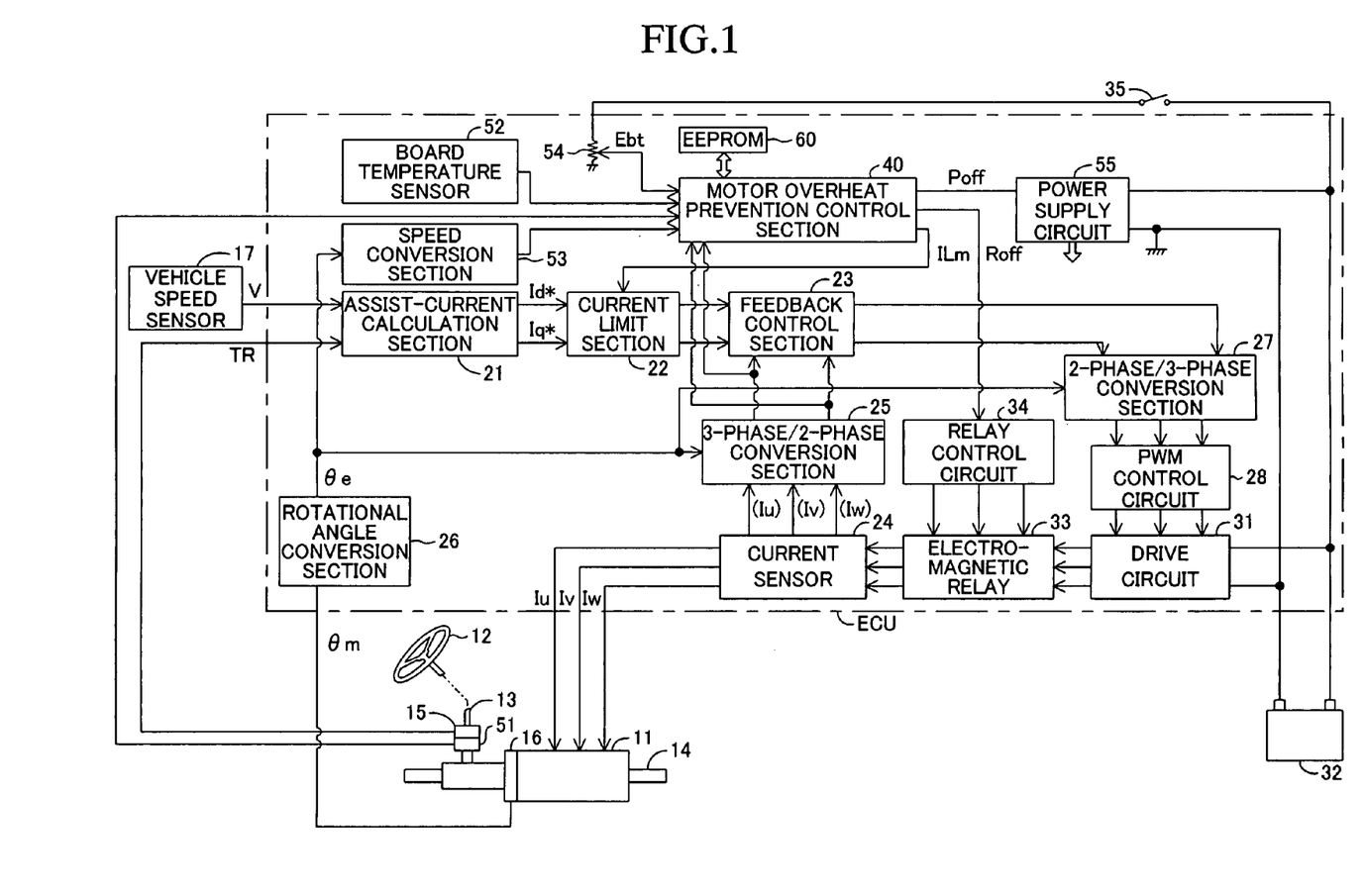
FIG. 1 is a schematic diagram showing the entire configuration of an electric power steering apparatus of a vehicle to which a motor-temperature estimation apparatus and a motor control apparatus according to an embodiment of the present invention are applied.

An embodiment of the present invention will be described with reference to the drawings. FIG. 1 schematically shows the entire configuration of an electric power steering apparatus of a vehicle to which a motor-temperature estimation apparatus and a motor control apparatus according to the present invention are applied.

First, the electric power steering apparatus will be described briefly. The electric power steering apparatus includes, as an electric motor, a brushless motor 11, which is a three-phase synchronous permanent magnet motor. The brushless motor 11 includes a stator fixedly disposed within a housing, and forms a three-phase rotating magnetic field through supply of three-phase current to coils wound on the stator, whereby a rotor to which permanent magnets are fixed rotates in the three-phase rotating magnetic field in accordance with the three-phase current.

Upon rotation of the rotor, the brushless motor 11 imparts assist force to steering motion of front wheels generated by rotating operation of a steering wheel 12. Specifically, a rack bar 14 is connected to the steering wheel 12 via a steering shaft 13 and a pinion gear (not shown), so that the rack bar 14 is displaced in an axial direction with rotation of the steering wheel 12. The rack bar 14 is also driven in the axial direction upon rotation of the brushless motor 11. The left and right front wheels are steerably connected to the opposite ends of the rack bar 14 via tie rods and knuckle arms (both are not shown).

A torque sensor 15 is attached to a lower end portion of the steering shaft 13, and detects steering torque TR imparted to the steering shaft 13. Moreover, a rotational angle sensor 16 formed by an encoder is attached to the brushless motor 11 in order to detect motor rotational angle (mechanical angle) θm. Upon rotation of the rotor of the brushless motor 11, the rotational angle sensor 16 outputs two-phase pulse-train signals having a phase difference of π/2, and a zero-phase pulse-train signal representing a reference rotational position. Data indicating torque TR detected by means of the steering toque sensor 15 and motor rotational angle θm detected by means of the rotational angle sensor 16 are supplied to an electronic control circuit unit ECU (indicated by a chain-line frame in FIG. 1). Moreover, data indicating vehicle speed V detected by means of a vehicle speed sensor 17 is supplied to the electronic control circuit unit ECU.

The electronic control circuit unit ECU controls three-phase current (assist current) supplied to the coils of the brushless motor 11, and includes an assist-current calculation section 21 for receiving the data indicating vehicle speed V and steering torque TR. The assist-current calculation section 21 calculates two instruction phase currents Id* and Iq* corresponding to assist torque which increases with steering torque TR and decreases with increase of vehicle speed V. Notably, these two instruction phase currents Id* and Iq* correspond to a d-axis and a q-axis, respectively, of a rotating coordinate system which is synchronous with rotating magnetic flux produced by a permanent magnet on the rotor of the brushless motor 11, where the d-axis extends in the same direction as that of the permanent magnet, and the q-axis extends in a direction perpendicular thereto. In the present embodiment, the instruction current Id* is set to "0." These two instruction phase currents Id* and Iq* are supplied to a feedback control section 23 via a current limit section 22, which will be described in detail later.

Two phase currents Id and Iq, which are converted from three phase currents Iu, Iv, and Iw flowing through the coils of the brushless motor 11, are supplied to the feedback control section 23. A current sensor 24 detects the three phase currents Iu, Iv, and Iw. A 3-phase/2-phase conversion section 25 converts the three phase currents Iu, Iv, and Iw to the two phase currents Id and Iq. For the purpose of 3-phase/2-phase conversion, a rotational angle conversion section 26, which converts motor rotational angle θm to electrical angle θe, is connected to the 3-phase/2-phase conversion section 25. The feedback control section 23 produces difference signals Id*−Id and Iq*−Iq, which represent respective differences between the two instruction phase currents Id* and Iq* and the two phase currents Id and Iq, so as to feedback-control the three phase currents Iu, Iv, and Iw flowing through the coils of the brushless motor 11.

The two phase difference signals Id*−Id and Iq*−Iq are converted to three phase signals by means of a 2-phase/3-phase conversion section 27; and the thus-obtained three phase signals are supplied to a PWM control circuit 28. For the purpose of the 2-phase/3-phase conversion, the electrical angle θe output from the rotational angle conversion section 26 is supplied to the 2-phase/3-phase conversion section 27. On the basis of the three phase signals output from the 2-phase/3-phase conversion section 27, the PWM control circuit 28 produces pulse-width modulation (PWM) control signals corresponding to the difference signals Id*−Id and Iq*−Iq, and supplies them to a drive circuit 31.

The drive circuit 31 switches battery voltage Ebt output from a battery 32 in accordance with the PWM control signals so as to supply three phase currents Iu, Iv, and Iw, which correspond to the PWM control signals, to the coils of the brushless motor 11 via an electromagnetic relay 33. The electromagnetic relay 33 is controlled by means of a relay control circuit 34, which will be described later in detail, and is usually in an on state after an ignition switch 35 is turned on. Therefore, during periods in which steering assist by the brushless motor 11 is effected, normally, the PWM-controlled three phase currents Iu, Iv, and Iw flow through the coils of the brushless motor 11.

By virtue of operations of the above-described respective circuits, three phase currents Iu, Iv, and Iw corresponding to the steering torque TR and the vehicle speed V are caused to flow through the brushless motor 11. Accordingly, the brushless motor 11 imparts assist torque corresponding to the steering torque TR and the vehicle speed V for steering operation of the steering wheel 12 by a driver. Notably, the above-described assist-current calculation section 21, current limit section 22, feedback control section 23, 3-phase/2-phase conversion section 25, rotational angle conversion section 26, and 2-phase/3-phase conversion section 27 within the electronic control circuit unit ECU may be formed by hardware; however, in the present embodiment, these sections are realized through execution of a microcomputer program. In other words, these sections 21 to 23 and 25 to 27 represent, in the form of a block diagram, various functions realized through execution of the microcomputer program.

Next, there will be described a motor overheat prevention apparatus which is applied to the above-described electric power steering apparatus for a vehicle and which relates directly to the present invention. The motor overheat prevention apparatus includes a motor overheat prevention control section 40, which is disposed in the electronic control circuit unit ECU. The motor overheat prevention control section 40 estimates temperatures of the housing, stator, and coils of the brushless motor 11, and limits current flowing through the brushless motor 11 when the coil temperature is high.

An ambient temperature sensor 51, a board temperature sensor 52, a speed conversion section 53, and a potentiometer 54 are connected to the input side of the motor overheat prevention control section 40. The ambient temperature sensor 51 is attached to the steering torque sensor 15, and detects ambient temperature TPtr of a location where the brushless motor 11 is disposed (outside air temperature). Notably, the ambient temperature sensor 51 is not necessarily required to be attached to the steering torque sensor 15, and may detect temperature at an arbitrary location near the brushless motor 11, so long as the ambient temperature sensor 51 can detect temperature at a location other than locations at which temperature increases due to influence of current flowing through the motor 11.

The board temperature sensor 52 is attached to a printed circuit board, on which the electronic control circuit unit ECU is disposed, and detects printed board temperature TPbd. The printed board temperature TPbd is used to estimate temperature drop which relates to ambient temperature and time between stop of operation of the brushless motor 11 and resumption thereof. Therefore, a temperature sensor for detecting temperature of a component other than the printed circuit board may be used instead of the board temperature sensor 52, so long as the alternative temperature sensor can detect temperature of a portion whose temperature increases due to influence of current flowing through the motor 11. For example, a temperature sensor for detecting temperature of an element which partially constitutes the electronic control circuit unit ECU may be used in place of the board temperature sensor 52.

The speed conversion section 53 differentiates the electrical angle θe output from the rotational angle conversion section 26 to thereby output a signal indicative of rotational speed RV of the rotor of the brushless motor 11. The potentiometer 54 is connected to the battery 32 via the ignition switch 35, and outputs, for detection of on-off state of the ignition switch 35, a voltage corresponding to the battery voltage Ebt supplied to the potentiometer via the ignition switch 35.

The current limit section 22, the relay control circuit 34, and a power supply circuit 55 are connected to the output side of the motor overheat prevention control section 40. The current limit section 22 receives motor current limit value ILm from the motor overheat prevention control section 40, and limits the instruction current Iq* (Id* is "0"), calculated at the assist-current calculation section 21, to the motor current limit value ILm or less, whereby current flowing through the coils of the brushless motor 11 is limited so as not to exceed the motor current limit value ILm. Notably, in actuality, three phase currents Iu, Iv, and Iw flow through the brushless motor 11; therefore, the three phase currents Iu, Iv, and Iw are limited so as not to exceed corresponding phase current values which are converted from the motor current limit value ILm.

The relay control circuit 34 turns the electromagnetic relay 33 on and off under the control of the motor overheat prevention control section 40, the electromagnetic relay 33 being provided in a current path to the brushless motor 11. The power supply circuit 55 is connected to the battery 32. Under the control of the motor overheat prevention control section 40, the power supply circuit 55 steps the voltage from the battery 32 up or down so as to supply operation voltages for various control sections and circuits.

Moreover, a writable, nonvolatile memory (hereinafter referred to as EEPROM) 60 is connected to the motor overheat prevention control section 40. The EEPROM 60 is used to store, at the end of operation of the brushless motor 11, various parameters which are needed to estimate temperatures of the housing, stator, and coils of the brushless motor 11 while the motor is in operation. Notably, the motor overheat prevention control section 40 and the speed conversion section 53 may be formed by hardware; however, in the present embodiment, these sections are realized through execution of a microcomputer program. In other words, these sections 40 and 53 represent, in the form of a block diagram, various functions realized through execution of the microcomputer program.

Figure 2:
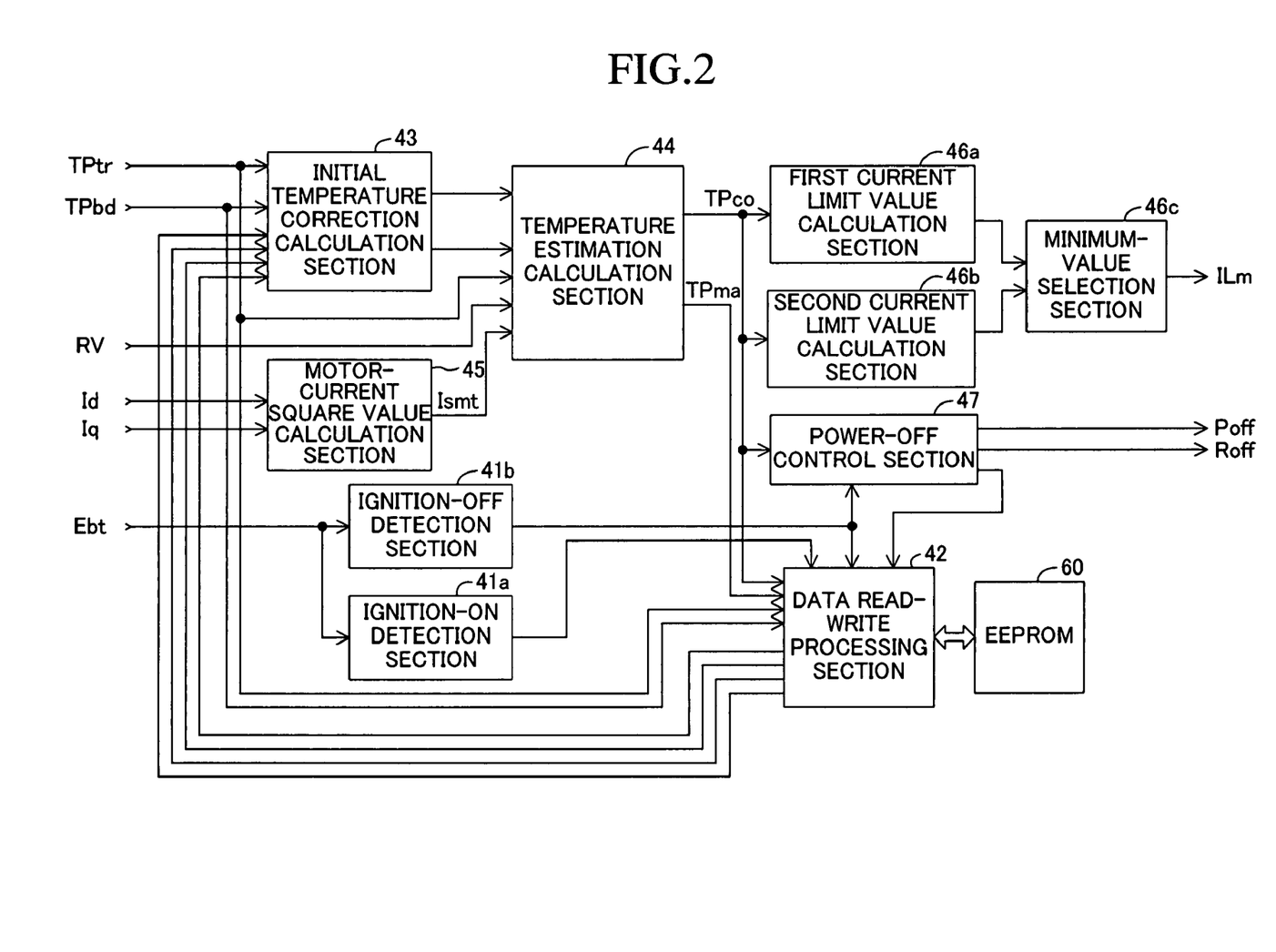
FIG. 2 is a functional block diagram showing, in detail, a motor overheat prevention control section of FIG. 1.

Next, the motor overheat prevention control section 40 will be described in detail with reference to the functional block diagram of FIG. 2. In this case as well, respective sections mentioned in the following description represent, in the form of a block diagram, various function realized through execution of the microcomputer program. In the following description, unless otherwise specified, it is assumed that voltage needed for operation is supplied from the power supply circuit 55 to the respective sections and circuits, and that the electromagnetic relay 33 is in the on state, so that three phase currents Iu, Iv, and Iw flow from the drive circuit 31 to the coils of the brushless motor 11.

Figure 3:
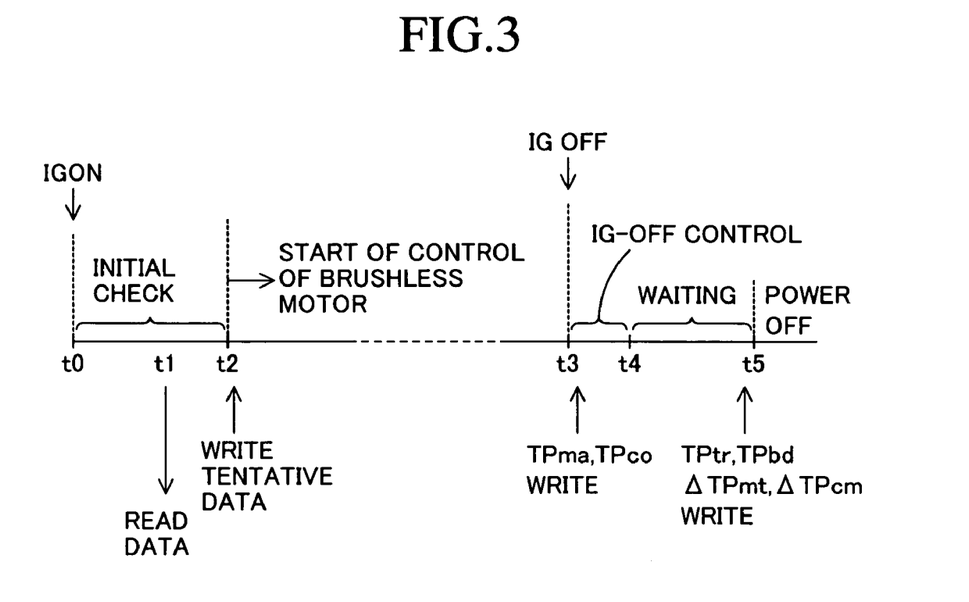
FIG. 3 is a time chart showing on-off operation of an ignition switch and the overall operation flow of the motor overheat prevention control section.

Before motor overheat prevention operation is specifically described, on-off operation of the ignition switch 35 and the overall operation flow of the motor overheat prevention control section 40 are described with reference to the time chart of FIG. 3. When the ignition switch 35 is turned on at time t0, an ignition-on detection section 41a detects the turn-on operation of the ignition switch 35 from an increase in the battery voltage Ebt output from the potentiometer 54. Notably, the battery voltage Ebt output from the potentiometer 54 undergoes analog-to-digital conversion performed by means of an unillustrated A/D converter. In response to detection of the turn-on operation of the ignition switch 35, the motor overheat prevention control section 40 performs unillustrated initial check processing. At predetermined time t1 during the initial check, a data read-write processing section 42 reads various stored data from the EEPROM 60, and supplies them to an initial temperature correction calculation section 43.

The initial temperature correction calculation section 43 calculates initial values of mass estimation temperature TPma, which is a variable representing estimated temperature of the mass portion (corresponding to the housing and stator) of the brushless motor 11, and coil estimation temperature TPco, which is a variable representing estimated temperature of the coils. A temperature estimation calculation section 44 starts to estimate, at predetermined short intervals, values of mass estimation temperature TPma and coil estimation temperature TPco by making use of these initial values and a motor current square value Ismt calculated at a motor-current square value calculation section 45. At time t2, a first current limit value calculation section 46a, a second current limit value calculation section 46b, and a minimum-value selection section 46c start control for limiting current flowing through the brushless motor 11 on the basis of the value of coil estimation temperature TPco. Notably, initial value calculation and estimation calculation for mass estimation temperature TPma and coil estimation temperature TPco, and operation for limiting the current of the brushless motor 11 will be described later in detail.

Immediately after start of control of the brushless motor 11 (immediately after time t2), the data read-write processing section 42 writes predetermined large values in the EEPROM 60 as tentative data of respective storage values TPtrep, TPmaep, TPcoep of ambient temperature TPtr, mass estimation temperature TPma, and coil estimation temperature TPco, in preparation for the case where data writing after that time is impossible. The reason why the large values are used is to avoid the possibility that in future estimation, ambient temperature TPtr and mass estimation temperature TPma are calculated as temperatures lower than actual temperatures.

When the ignition switch 35 is turned off at time t3 during control of the brushless motor 11, an ignition-off detection section 41b detects the turn-off operation of the ignition switch 35 from a decrease in the battery voltage Ebt output from the potentiometer 54. In this case, the ignition-off detection section 41b detects the turn-off of the ignition switch 35 upon satisfaction of conditions that the battery voltage Ebt is lower than a predetermined value and that this low voltage state continues for at least a predetermined period.

In response to detection of the turn-off of the ignition switch 35, the motor overheat prevention control section 40 performs various controls (IG off control) in relation to the turn-off of the ignition switch 35. As the ignition off control (IG off control), the data read-write processing section 42 writes, immediately after the detection of the turn-off of the ignition switch 35 (immediately after time t3), the present values of mass estimation temperature TPma and coil estimation temperature TPco in the EEPROM 60 as mass temperature storage value TPmaep and coil temperature storage value TPcoep. This processing is performed in preparation for the case in which writing of data in the EEPROM 60 becomes impossible at the time of power off.

Figure 4:
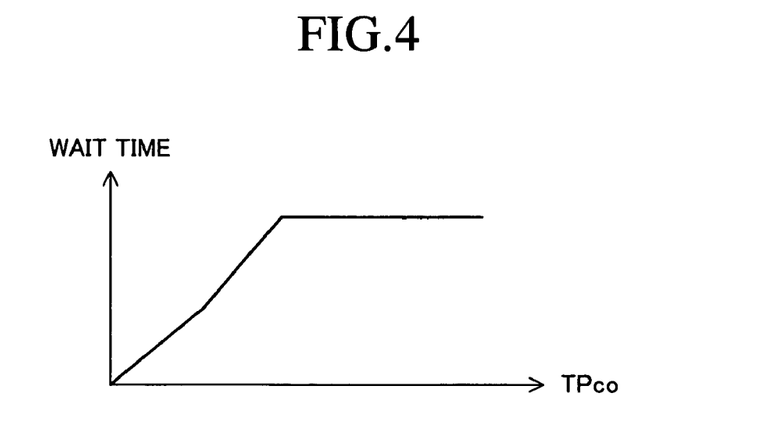
FIG. 4 is a graph showing the relation between coil estimation temperature TPco and wait time.

Moreover, in response to detection of turn-off of the ignition switch 35, a power-off control section 47 sets a wait time before power off. In this wait-time setting operation, a wait-time table stored in the power-off control section 47 is referred to, and a wait time corresponding to coil estimation temperature TPco at that time is set. As shown in FIG. 4, the wait time table stores wait time which increases with coil estimation temperature TPco.

At time t4 at which the above-mentioned IG off control processing ends, the power-off control section 47 starts measurement of the wait time set as described above, and outputs to the relay control circuit 34 a relay off signal Roff for turning the electromagnetic relay 33 off. As a result, the relay control circuit 34 turns the electromagnetic relay 33 off, whereby no current flows through the brushless motor 11 after that time. This operation is performed so as to minimize current flowing within the electronic control circuit unit ECU.

When the power-off control section 47 completes the measurement of the set wait time, at time t5, the power-off control section 47 instructs the data read-write processing section 42 to write data. The data read-write processing section 42 writes ambient temperature TPtr and printed board temperature TPbd at that time in the EEPROM 60 as ambient temperature storage value TPtrep and printed board temperature storage value TPbdep, respectively. Moreover, the data read-write processing section 42 writes the difference TPma-TPtr between mass estimation temperature TPma and ambient temperature TPtr at that time and the difference TPco-TPma between coil estimation temperature TPco and mass estimation temperature TPma at that time in the EEPROM 60 as mass-ambient temperature difference storage value ΔTPmtep and coil-mass temperature difference storage value ΔTPcmep, respectively.

After the above data are written in the EEPROM 60 as ambient temperature storage value TPtrep, printed board temperature storage value TPbdep, mass-ambient temperature difference storage value ΔTPmtep, and coil-mass temperature difference storage value ΔTPcmep, the power-off control section 47 outputs a power off signal Poff to the power supply circuit 55. In response thereto, the power supply circuit 55 stops supply of power to all the circuits. The reason why wait time is provided before power off is to wait for mass estimation temperature TPma and coil estimation temperature TPco to decrease to some degree. Needless to say, during this wait period as well, estimation calculation for determining mass estimation temperature TPma and coil estimation temperature TPco is continued. This operation improves accuracy in estimating mass estimation temperature TPma and coil estimation temperature TPco in a state in which the ignition switch 35 is turned on next time.

Next, initial value calculation and estimation calculation for mass estimation temperature TPma and coil estimation temperature TPco and operation of limiting current of the brushless motor 11 will be described in detail. The initial value calculation and estimation calculation for mass estimation temperature TPma and coil estimation temperature TPco are performed in the initial temperature correction calculation section 43. In the initial value calculation, ambient temperature TPtr and printed board temperature TPbd at that time are used along with ambient temperature storage value TPtrep, printed board temperature storage value TPbdep, mass-ambient temperature difference storage value ΔTPmtep, and coil-mass temperature difference storage value ΔTPcmep. Moreover, in initial value calculation for special situations, ambient temperature storage value TPtrep, mass temperature storage value TPmaep, and coil temperature storage value TPcoep are used. These storage values TPtrep, TPbdep, ΔTPmtep, ΔTPcmep, TPmaep, and TPcoep are stored in the EEPROM 60 as described above, and in response to turn-on of the ignition switch 35, are read out by the data read-write processing section 42 and supplied to the initial temperature correction calculation section 43.

First, operation in an ordinary situation; i.e., a situation other than the below-described special situations, will be described. In this case, the initial temperature correction calculation section 43 first subtracts printed board temperature TPbd from printed board temperature storage value TPbdep to thereby obtain printed board temperature change ΔTPbd (=TPbdep−TPbd) between the time when the ignition switch 35 is turned off and the time when the ignition switch 35 is again turned on.

Figure 5A:
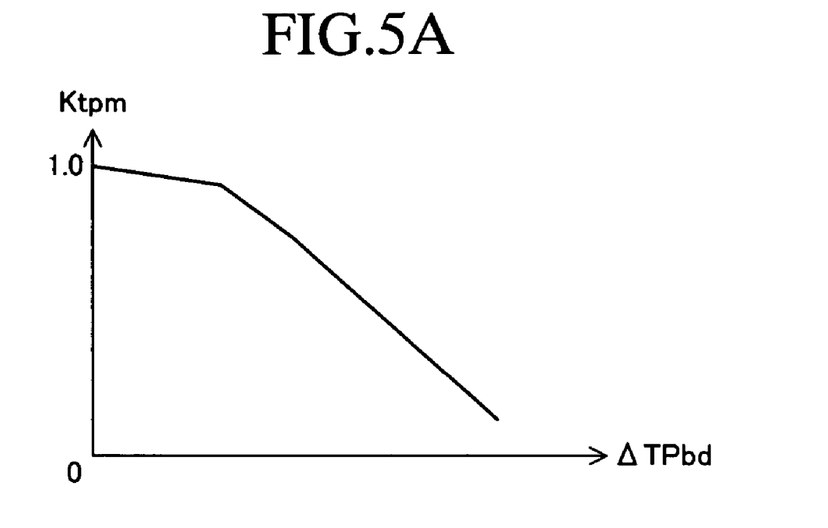
FIG. 5A is a graph showing a change in mass-temperature initial correction coefficient Ktpm with printed board temperature change ΔTPbd.
Figure 5B:
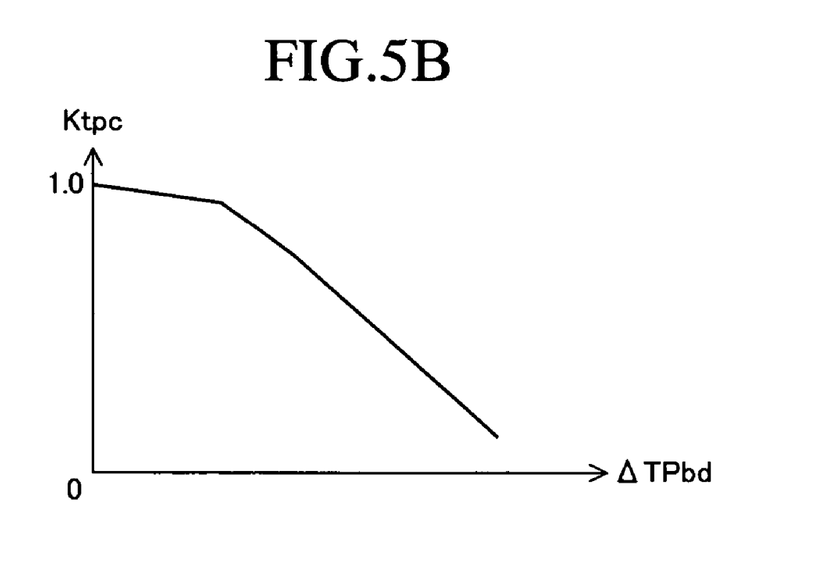
FIG. 5B is a graph showing a change in coil-temperature initial correction coefficient Ktpc with printed board temperature change ΔTPbd.

Subsequently, with reference to a mass temperature initial correction coefficient map and a coil temperature initial correction coefficient map provided in the initial temperature correction calculation section 43, the initial temperature correction calculation section 43 calculates a mass temperature initial correction coefficient Ktpm and a coil temperature initial correction coefficient Ktpc corresponding to the printed board temperature change ΔTPbd. These mass temperature initial correction coefficient map and coil temperature initial correction coefficient map respectively represent changes in mass temperature and coil temperature corresponding to change in printed board temperature TPbd, and decrease as the printed board temperature change ΔTPbd increases, as shown in FIGS. 5A and 5B, respectively. Notably, these maps can be obtained empirically or calculated from the relation between heat radiation of the printed board and heat radiation of the mass portion and coils.

Initial values of mass estimation temperature TPma and coil estimation temperature TPco are successively calculated in accordance with the following Equations (1) and (2) which use the above-mentioned mass-ambient temperature difference storage value ΔTPmtep, coil-mass temperature difference storage value ΔTPcmep, mass temperature initial correction coefficient Ktpm, coil temperature initial correction coefficient Ktpc, and ambient temperature TPtr.

$$TPma = Ktpm \cdot \Delta TPmtep + TPtr \quad (1)$$

$$TPco = Ktpc \cdot \Delta TPcmep + TPma \quad (2)$$

The reason why calculations of respective initial values of mass estimation temperature TPma and coil estimation temperature TPco are performed separately, and estimation calculations for mass estimation temperature TPma and coil estimation temperature TPco to be described later are performed separately is that the mass portion and the coils differ from each other in terms of heat radiation and heat generation characteristics.

Moreover, in the present embodiment, the mass temperature initial correction coefficient Ktpm and the coil temperature initial correction coefficient Ktpc are calculated by making use of printed board temperature change ΔTPbd. However, the mass temperature initial correction coefficient Ktpm and the coil temperature initial correction coefficient Ktpc may be calculated by making use of ambient temperature change ΔTPtr. In this case, there are prepared a mass temperature initial correction coefficient map and a coil temperature initial correction coefficient map which respectively define mass temperature initial correction coefficient Ktpm and coil temperature initial correction coefficient Ktpc which change in accordance with change in ambient temperature TPtr. Ambient temperature TPtr is subtracted from ambient temperature storage value TPtrep stored in the EEPROM 60 to obtain a change value ΔTPtr (=TPtrep−TPtr), and a mass temperature initial correction coefficient Ktpm and a coil temperature initial correction coefficient Ktpc corresponding to the change value ΔTPtr (=TPtrep−TPtr) are calculated with reference to the mass temperature initial correction coefficient map and the coil temperature initial correction coefficient map, respectively.

Next, calculation of initial values of mass estimation temperature TPma and coil estimation temperature TPco in special situations will be described. A first special situation is the case where data were failed to be written in the EEPROM 60 at the time of previous power off (immediately before time t5 of FIG. 3); that is, the case where previous ambient temperature storage value TPtrep, printed board temperature storage value TPbdep, mass-ambient temperature difference storage value ΔTPmtep, and coil-mass temperature difference storage value ΔTPcmep cannot be read out of the EEPROM 60. In this situation, calculation of the above-mentioned Equations (1) and (2) is impossible. In this case, mass estimation temperature TPma and coil estimation temperature TPco are initially set to the mass temperature storage value TPmaep and coil temperature storage value TPcoep written in the EEPROM 60 at the time of turn off of the ignition switch 35 (at time t3 of FIG. 3). Moreover, in the case where even the mass temperature storage value TPmaep and the coil temperature storage value TPcoep were not written in the EEPROM 60, the tentative data written in the EEPROM 60 at time t2 of FIG. 3 are utilized.

A second special situation is the case where printed board temperature TPbd assumes an anomalous value. In this situation, calculation of the mass temperature initial correction coefficient Ktpm and the coil temperature initial correction coefficient Ktpc corresponding to the printed board temperature change ΔTPbd is impossible, and calculation of the above-mentioned Equations (1) and (2) is impossible. In this case, as in the first special case, mass estimation temperature TPma and coil estimation temperature TPco are initially set to the mass temperature storage value TPmaep and coil temperature storage value TPcoep, respectively.

A third special situation is the case where ambient temperature TPtr is not higher than a considerably low, predetermined temperature (e.g., not greater than 0° C.). In this situation, ambient temperature TPtr is considerably low, and the temperatures of the housing, stator, and coils of the brushless motor 11 are expected to be equal to the considerably low ambient temperature TPtr. In this case, mass estimation temperature TPma and coil estimation temperature TPco are initially set to the ambient temperature TPtr.

A fourth special situation is the case where the vehicle is placed in the blazing sun in summer. Existence of this situation is determined on the basis of conditions such that ambient temperature TPtr is higher than ambient temperature storage value TPtrep, printed board temperature TPbd is not lower than a considerably high, predetermined temperature (e.g., not lower than 85° C.), or ambient temperature TPtr is not lower than a considerably high, predetermined temperature (e.g., not lower than 85° C.). In this case, mass estimation temperature TPma is initially set to the higher one of ambient temperature TPtr and mass temperature storage value TPmaep. Also, coil estimation temperature TPco is initially set to the higher one of ambient temperature TPtr and coil temperature storage value TPcoep.

The temperature estimation calculation section 44 calculates the temperatures of the housing (or stator) and coils of the brushless motor 11, which change with passage of time, while repeatedly updating the initially set mass estimation temperature TPma and the initially set coil estimation temperature TPco. In this temperature calculation, rotational speed RV and motor-current square value Ismt are utilized. The rotational speed RV is rotational speed of the brushless motor 11 calculated in the speed conversion section 53. The motor-current square value Ismt is equal to the sum Id²+Iq² of square values of two phase currents Id and Iq flowing through the brushless motor 11, the square values being calculated in the motor-current square value calculation section 45. Notably, the motor-current square value Ismt is proportional to quantity of heat generated by current flowing through the coils of the brushless motor 11.

Figure 6:
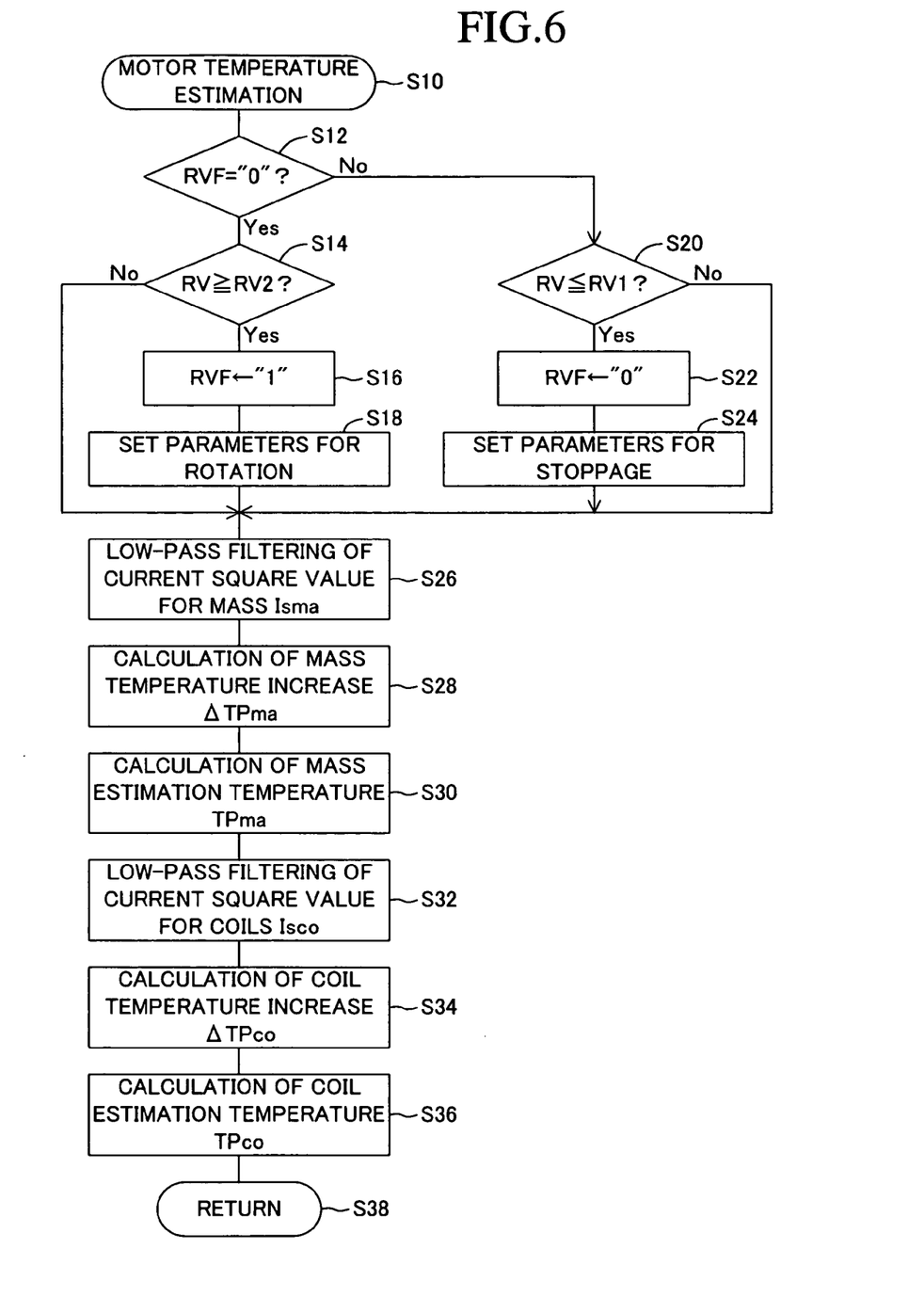
FIG. 6 is a flowchart of a motor-temperature estimation program executed in a temperature estimation calculation section.

Estimation calculation processing that the temperature estimation calculation section 44 performs to obtain mass estimation temperature TPma and coil estimation temperature TPco is shown as a motor-temperature estimation program in the flowchart of FIG. 6. This motor-temperature estimation program consists of steps S10 to S38 and is repeatedly executed at short time intervals (e.g., 80 milliseconds). After starting the execution of the program from step S10, the calculation section 44 determines in step S12 whether a rotation flag RVF is "0." This rotation flag RVF indicates that the brushless motor 11 is currently rotating when its value is "1" and indicates that the brushless motor 11 is currently stopped when its value is "0." When the value of the rotation flag RVF is "0," the calculation section 44 makes a "Yes" determination in step S12, and processing proceeds to step S14. In step S14, the calculation section 44 determines whether the rotational speed RV is not less than a predetermined low speed RV2 (e.g., 0.3 radian/sec). When the rotational speed RV is not less than the predetermined low speed RV2, the calculation section 44 makes a "Yes" determination in step S14, proceeds to step S16 so as to change the rotation flag RVF to "1," and then proceeds to step S18. When the rotational speed RV is less than the predetermined low speed RV2, the calculation section 44 makes a "No" determination in step S14, and processing proceeds to step S26.

In step S18, the calculation section 44 selects parameters for rotation (parameters in relation to rotation periods of the brushless motor 11) as parameters to be used in the below-described calculation processing. These parameters include current mass delay count Nima, current mass temperature correction coefficient Kima, current coil delay count Nico, and current coil temperature correction coefficient Kico.

Meanwhile, when the value of the rotation flag RVF is "1," the calculation section 44 makes a "No" determination in step S12, and processing proceeds to step S20. In step S20, the calculation section 44 determines whether the rotational speed RV is not greater than a predetermined speed RV1 (e.g., 0.1 radian/sec) smaller than the predetermined speed RV2. The reason why the predetermined speed RV1 is set smaller than the predetermined speed RV2 is to provide hysteresis in detection of rotating state and stopped state of the brushless motor 11 to thereby avoid hunting. When the rotational speed RV is not greater than the predetermined speed RV1, the calculation section 44 makes a "Yes" determination in step S20, proceeds to step S22 so as to change the rotation flag RVF to "0," and then proceeds to step S24. When the rotational speed RV is greater than the predetermined speed RV1, the calculation section 44 makes a "No" determination in step S20, and processing proceeds to step S26.

In step S24, the calculation section 44 selects parameters for stoppage (parameters in relation to stop periods of the brushless motor 11) as parameters to be used in the below-described calculation processing.

As described above, the various parameters used in the calculation processing are set to different values for rotating periods and stop periods of the brushless motor 11. Specifically, the current mass delay count Nima and the current coil delay count Nico delay changes in values in estimation calculation for mass estimation temperature TPma and coil estimation temperature TPco. That is, these parameters smooth changes in these values. The greater the values of the current mass delay count Nima and the current coil delay count Nico, the greater the delay that the values represent. Therefore, during periods in which the brushless motor 11 is stopped, the current mass delay count Nima and the current coil delay count Nico are set to smaller values as compared with periods in which the brushless motor 11 rotates. The current mass temperature correction coefficient Kima and the current coil temperature correction coefficient Kico are parameters which represent the degree of influence of current square value for mass Isma and current square value for coils Isco on mass estimation temperature TPma and coil estimation temperature TPco. The greater the values of the current mass temperature correction coefficient Kima and the current coil temperature correction coefficient Kico, the greater the degree of influence that the values represent. Therefore, during periods in which the brushless motor 11 is stopped, the current mass temperature correction coefficient Kima and the current coil temperature correction coefficient Kico are set to larger values as compared with periods in which the brushless motor 11 rotates. Notably, current square value for mass Isma and current square value for coils Isco correspond to respective quantities of heat generation which cause temperature increases in the mass portion and the coils, and are values obtained through low-pass filtering of motor current square value Ismt.

After the processing of steps S12 to S24, in step S26, the calculation section 44 of the motor overheat prevention control section 40 performs low-pass-filtering calculation of the following Equation (3), which uses motor current square value Ismt and current mass delay count Niam, to thereby obtain current square value for mass Isma.

$$Isma(n)=Isma\ (n-1)+\{Ismt-Isma(n-1)\}/Nima \quad (3)$$

Figure 7:
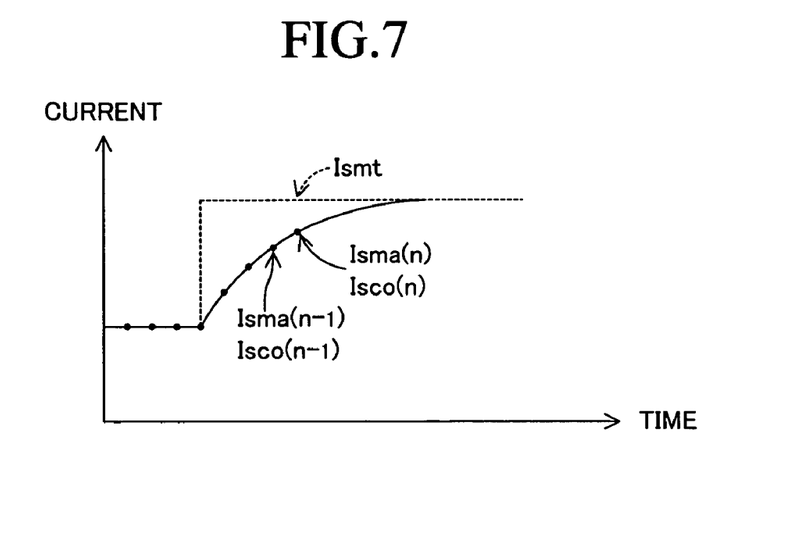
FIG. 7 is a time chart showing changes with time in motor-current square value Ismt, current square value for mass Isma, and current square value for coils Isco.

Notably, in Equation (3), Isma(n) represents the present calculated value (present value) of current square value for mass Isma, and Isma(n−1) represents the previous calculated value (value at time 80 milliseconds before the present time) of current square value for mass Isma (see FIG. 7). Subsequently, in step S28, the calculation section 44 calculates mass temperature increase ΔTPma through execution of calculation according to the following Equation (4), which uses the calculated current square value for mass Isma(n) and the current mass temperature correction coefficient Kima.

$$\Delta TPma=a\cdot Kima\cdot Isma(n) \quad (4)$$

Notably, in Equation (4), "a" is a predetermined proportionality constant. Subsequently, in step S30, the calculation section 44 calculates mass estimation temperature TPma through execution of calculation according to the following Equation (5), which uses the calculated mass temperature increase ΔTPma and ambient temperature TPtr.

$$TPma = TPtr + \Delta TPma \quad (5)$$

After the processing of steps S26 to S30, in step S32, the calculation section 44 performs low-pass-filtering calculation of the following Equation (6), which uses motor current square value Ismt and current coil delay count Nico, to thereby obtain current square value for coils Isco.

$$Isco(n) = Isco(n-1) + \{Ismt - Isco(n-1)\}/Nico \quad (6)$$

Notably, in Equation (6), Isco(n) represents the present calculated value (present value) of current square value for coils Isco, and Isco(n−1) represents the previous calculated value (value at time 80 milliseconds before the present time) of current square value for coils Isco (see FIG. 7). Subsequently, in step S34, the calculation section 44 calculates coil temperature increase ΔTPco through execution of calculation according to the following Equation (7), which uses the calculated current square value for coils Isco(n) and the current coil temperature correction coefficient Kico.

$$\Delta TPco = b \cdot Kico \cdot Isco(n) \quad (7)$$

Notably, in Equation (7), b is a predetermined proportionality constant. Subsequently, in step S36, the calculation section 44 calculates coil estimation temperature TPco through execution of calculation according to the following Equation (8), which uses the calculated coil temperature increase ΔTPco and mass estimation temperature TPma. After that, in step S38, the calculation section 44 ends the motor-temperature estimation program.

$$TPco = TPma + \Delta TPco \quad (8)$$

As can be understood from the above description, temperatures of the mass portion and coils of the brushless motor 11 are estimated in different manners of calculation between the case where the brushless motor 11 is rotating and the case where the brushless motor 11 is stopped; i.e., in consideration of difference in temperature increase caused by current flowing through the coils between the case where the brushless motor 11 is rotating and the case where the brushless motor 11 is stopped. As a result, temperatures of the mass portion and coils of the brushless motor 11 can be detected by means of a simple configuration, without necessity of incorporating a temperature sensor in the brushless motor 11. Moreover, in estimation of coil temperature, the mass portion and the coils which differ in heat radiation and heat generation characteristics are separated from each other, and calculation is performed while different parameters are used for the mass portion and the coils. Therefore, coil temperature can be detected accurately.

Figure 8:
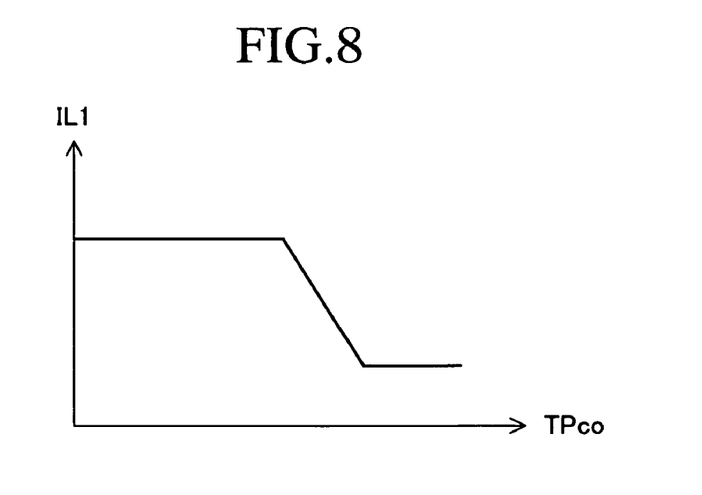
FIG. 8 is a graph showing the relation between coil estimation temperature TPco and first current limit value IL1.

The value of coil estimation temperature TPco calculated in the temperature estimation calculation section 44 is supplied to the first current limit value calculation section 46a and the second current limit value calculation section 46b. The first current limit value calculation section 46a calculates a first current limit value IL1 corresponding to the calculated value of coil estimation temperature TPco with reference to a current limit value table. This current limit value table is provided in the first current limit value calculation section 46a, and, as shown in FIG. 8, the table stores the first current limit value IL1, which decreases with increase in coil estimation temperature TPco.

The second current limit value calculation section 46b calculates a second current limit value IL2 which supplements the first current limit value IL1 calculated in the first current limit value calculation section 46a and forcedly limits current when coil estimation temperature TPco becomes considerably high. When coil estimation temperature TPco exceeds the very high, predetermined temperature, the second current limit value calculation section 46b sets a target current limit value ILtg to a predetermined small value, and repeatedly executes the calculation (low-pass filtering processing) of the following Equation (9) at predetermined short intervals.

$$IL2(n) = IL2(n-1) + Kf1 \cdot (ILtg - IL2(n-1)) \quad (9)$$

Notably, in Equation (9), IL2(n) represents the present calculated value (present value) of second current limit value IL2, and IL2(n−1) represents the previous calculated value (value at time 80 milliseconds before the present time) of second current limit value IL2. Further, the coefficient Kf1 is a predetermined constant less than "1." Through execution of calculation of Equation (9), the second current limit value IL2 gradually decreases to the target current limit value ILtg when coil estimation temperature TPco exceeds the predetermined temperature.

Meanwhile, when coil estimation temperature TPco becomes lower than a predetermined temperature, the second current limit value calculation section 46b sets the target current limit value ILtg to a predetermined value (e.g., 60 A), and repeatedly executes the calculation of Equation (9). As a result, the above-mentioned forced current limit is cancelled, and the second current limit value IL2 gradually increases to the target current limit value ILtg set to the predetermined current value.

The thus calculated first and second current limit values IL1 and IL2 are supplied to the minimum value selection section 46c. The minimum value selection section 46c selects the smaller one of the first and second current limit values IL1 and IL2 to be used as a motor-current limit value ILm. The thus-determined motor-current limit value ILm is supplied to the current limit section 22. As described above, the current limit section 22 limits three phase currents Iu, Iv, and Iw flowing through the brushless motor 11 in accordance with the motor-current limit value ILm.

Accordingly, when the coil temperature of the brushless motor 11 increases, the current supplied to the brushless motor 11 is limited, whereby the coil temperature does not increase. This prevents breakage of insulation, which breakage would otherwise occur because of melting of coating of the coils. Further, in addition to the first current limit value IL1, the second current limit value IL2 is taken into consideration, whereby increase in coil temperature of the brushless motor 11 is properly suppressed even in the case where the limit of current of the brushless motor 11 by means of the first current limit value IL1 results in an increase in coil temperature.

In the case where the second current limit value IL2 is employed, when coil estimation temperature TPco exceeds the predetermined temperature, current flowing through the brushless motor 11 is forcedly limited to the predetermined limit value or less. Accordingly, temperature increase of the coils of the brushless motor 11 can be suppressed without fail. Moreover, when current flowing through the brushless motor 11 is limited to the predetermined limit value or less, the limit value changes gradually. This operation avoids abrupt change in output of the brushless motor 11.

In the above-described embodiment, a motor-current square value Ismt ($=Id^2 + Iq^2$) is calculated from two phase currents Id and Iq, and temperature of the entire coil of the brushless motor 11 is estimated on the basis of the motor-current square value Ismt. Alternatively, coil temperature may be estimated on a phase-by-phase fashion on the basis of three phase currents Iu, Iv, and Iw actually flowing through the brushless motor 11. In this case, the motor overheat prevention control section 40 receives data indicative of three phase currents Iu, Iv, and Iw of the brushless motor 11 detected by means of the current sensor 24. Subsequently, in place of the motor-current square value Ismt of the above-described embodiment, the motor overheat prevention control section 40 calculates respective current square values $Iu^2$, $Iv^2$, and $Iw^2$ of the three phases, and performs, on the respective current square values $Iu^2$, $Iv^2$, and $Iw^2$, the calculation processing applied to the motor-current square value Ismt of the above-described embodiment, to thereby estimate the respective coil temperatures of the individual phases. Subsequently, of the coil temperatures of the individual phases, the highest coil temperature is selected, and current flowing through the brushless motor 11 is limited on the basis of the selected coil temperature.

In the above-described embodiment, mass estimation temperature TPma of the mass portion (housing, stator, etc.) is utilized in the course of calculation of coil estimation temperature TPco of the brushless motor 11. Other use of mass estimation temperature TPma is not described. However, mass estimation temperature TPma may be used to correct a decrease in permeability of the stator caused by temperature increase of the brushless motor 11. In this case, three phase currents of the brushless motor 11 are increased as mass estimation temperature TPma increases.

In the above-described embodiment, three phase currents Iu, Iv, and Iw are detected by means of the current sensor 24. However, in an alternative embodiment, only two phase currents are detected by means of the current sensor 24, and the remaining phase current is calculated by use of the detected two phase currents. For example, of three phase currents Iu, Iv, and Iw, two phase currents Iu and Iv are detected by means of the current sensor 24, and the remaining phase current Iw is calculated by the formula —(Iu+Iv).

In the present embodiment, the present invention is applied to the brushless motor 11. However, the present invention can be applied to various types of motors other than the brushless motor 11.

In the present embodiment, the present invention is applied to an electric motor for imparting assist torque to rotating operation of the steering wheel 12 of the vehicle. However, the present invention can be applied to other various types of electric motors mounted on the vehicle; for example, an electric motor which is incorporated in a steer-by-wire-type steering apparatus and imparts steering torque to wheels. Moreover, the present invention can be applied to electric motors incorporated in various apparatus other than vehicles.

The present invention is not limited to the above-described embodiment and modifications, and other various modifications may be employed within the scope of the present invention.

The invention claimed is:

1. A motor-temperature estimation apparatus comprising:
   a current detection device for detecting current flowing through a coil of an electric motor;
   a determination device for determining whether the electric motor is in a rotating state or in a stopped state; and
   an estimation calculation device for estimatingly calculating a temperature of the electric motor on the basis of the detected current and through calculation which changes depending on results of the determination as to whether the electric motor is in the rotating state or in the stopped state and considers a difference, in temperature increase caused by current flowing through the coil, between the rotating state and the stopped state of the electric motor.

2. A motor-temperature estimation apparatus according to claim 1, wherein the estimation calculation device comprises:
   a square value calculation device for calculating a square value of the detected current;
   a low-pass-filtering device for performing low-pass-filtering calculation for the calculated current square value in a manner which changes depending on results of the determination as to whether the electric motor is in the rotating state or in the stopped state;
   a temperature increase calculation device for calculating a temperature increase stemming from current flowing through the coil on the basis of the low-pass-filtered current square value; and
   a temperature calculation device for calculating temperature of the electric motor on the basis of the calculated temperature increase.

3. A motor-temperature estimation apparatus according to claim 2, wherein the low-pass filtering device smoothes change in the calculated current square value, and when the electric motor is in the stopped state, the low-pass filtering device renders change in the calculated current square value sharp, as compared with the case where the electric motor is in the rotating state.

4. A motor-temperature estimation apparatus according to claim 2, wherein the temperature increase calculation device calculates a temperature increase which increases with the low-pass-filtered current square value; and when the electric motor is in the stopped state, the temperature increase calculation device increases the increase rate of the temperature increase, as compared with the case where the electric motor is in the rotating state.

5. A motor-temperature estimation apparatus according to claim 1, wherein
   the electric motor is of a three-phase type;
   the current detection device detects two phase currents converted from three phase currents; and
   the estimation calculation device calculates and estimates temperature of the electric motor on the basis of the sum of respective square values of the two phase currents.

6. A motor-temperature estimation apparatus according to claim 1,
wherein
   the electric motor is of a three-phase type;
   the current detection device detects three phase currents; and
   the estimation calculation device calculates and estimates temperature of the electric motor on the basis of respective square values of the three phase currents.

7. A motor-temperature estimation apparatus according to claim 1, wherein
   the electric motor is of a three-phase type;
   the current detection device detects two phase currents, and calculates the remaining phase current from the detected two phase currents; and
   the estimation calculation device calculates and estimates temperature of the electric motor on the basis of respective square values of the three phase currents.

8. A motor-temperature estimation apparatus comprising:
   an ambient temperature detection device for detecting ambient temperature of an electric motor;

a current detection device for detecting current flowing through a coil of the electric motor;

a square value calculation device for calculating a square value of the detected current;

a determination device for determining whether the electric motor is in a rotating state or in a stopped state;

a mass-temperature increase calculation device for calculating, on the basis of the calculated current square value, a temperature increase of a mass portion of the electric motor stemming from current flowing through the coil, through calculation which changes depending on results of the determination as to whether the electric motor is in the rotating state or in the stopped state and considers a difference, in temperature increase caused by current flowing through the coil, between the rotating state and the stopped state of the electric motor; and a mass-temperature calculation device for calculating temperature of the mass portion of the electric motor by adding the calculated temperature increase of the mass portion to the detected ambient temperature.

9. A motor-temperature estimation apparatus according to claim 8, wherein the mass-temperature increase calculation device comprises first low-pass filtering device for performing low-pass-filtering calculation for the calculated current square value in a manner which changes depending on results of the determination as to whether the electric motor is in the rotating state or in the stopped state, wherein the temperature increase of the mass portion of the electric motor stemming from current flowing through the coil is calculated on the basis of the low-pass-filtered current square value.

10. A motor-temperature estimation apparatus according to claim 9, wherein the first low-pass filtering device smoothes change in the calculated current square value, and when the electric motor is in the stopped state, the first low-pass filtering device renders change in the calculated current square value sharp, as compared with the case where the electric motor is in the rotating state.

11. A motor-temperature estimation apparatus according to claim 9, wherein the mass-temperature increase calculation device calculates a temperature increase of the mass portion which increases with the current square value low-pass-filtered by device of the first low-pass filtering device; and when the electric motor is in the stopped state, the mass-temperature increase calculation device increases the increase rate of the temperature increase of the mass portion, as compared with the case where the electric motor is in the rotating state.

12. A motor-temperature estimation apparatus according to claim 8, further comprising:

a coil-temperature increase calculation device for calculating, on the basis of the calculated current square value, a temperature increase of the coil of the electric motor stemming from current flowing through the coil, through calculation which changes depending on results of the determination as to whether the electric motor is in the rotating state or in the stopped state; and a coil-temperature calculation device for calculating temperature of the coil of the electric motor by adding the calculated temperature increase of the coil to the calculated temperature of the mass portion.

13. A motor-temperature estimation apparatus according to claim 12, wherein the coil-temperature increase calculation device comprises second low-pass filtering device for performing low-pass-filtering calculation for the calculated current square value in a manner which changes depending on results of the determination as to whether the electric motor is in the rotating state or in the stopped state, wherein the temperature increase of the coil of the electric motor stemming from current flowing through the coil is calculated on the basis of the low-pass-filtered current square value.

14. A motor-temperature estimation apparatus according to claim 13, wherein the second low-pass filtering device smoothes change in the calculated current square value, and when the electric motor is in the stopped state, the second low-pass filtering device renders change in the current square value sharp, as compared with the case where the electric motor is in the rotating state.

15. A motor-temperature estimation apparatus according to claim 13, wherein the coil-temperature increase calculation device calculates a temperature increase of the coil which increases with the current square value low-pass-filtered by device of the second low-pass filtering device; and when the electric motor is in the stopped state, the coil-temperature increase calculation means device increases the increase rate of the temperature increase of the coil, as compared with the case where the electric motor is in the rotating state.

16. A motor-temperature estimation apparatus according to claim 1, wherein the electric motor is incorporated in a steering apparatus of a vehicle.

17. A motor control apparatus comprising:

a current detection device for detecting current flowing through a coil of an electric motor;

a determination device for determining whether the electric motor is in a rotating state or in a stopped state;

a coil-temperature estimation calculation device for estimatingly calculating temperature of the coil of the electric motor on the basis of the detected current and through calculation which changes depending on results of the determination as to whether the electric motor is in the rotating state or in the stopped state and considers a difference, in temperature increase caused by current flowing through the coil, between the rotating state and the stopped state of the electric motor; and a current limiting device for limiting current flowing through the electric motor in accordance with the estimatingly calculated temperature of the coil.

18. A motor control apparatus comprising:

an ambient temperature detection device for detecting ambient temperature of an electric motor;

a current detection device for detecting current flowing through a coil of the electric motor;

a square value calculation device for calculating a square value of the detected current;

a determination device for determining whether the electric motor is in a rotating state or in a stopped state;

a mass-temperature increase calculation device for calculating, on the basis of the calculated current square value, a temperature increase of a mass portion of the electric motor stemming from current flowing through the coil, through calculation which changes depending on results of the determination as to whether the electric motor is in the rotating state or in the stopped state;

a mass-temperature estimation device for estimatingly calculating temperature of the mass portion of the electric motor by adding the calculated temperature increase of the mass portion to the detected ambient temperature;

a coil-temperature increase calculation device for calculating, on the basis of the calculated current square value, a temperature increase of the coil of the electric motor stemming from current flowing through the coil, through calculation which changes depending on results of the determination as to whether the electric motor is in the rotating state or in the stopped state;

a coil-temperature estimation device for estimatingly calculating temperature of the coil of the electric motor by adding the calculated temperature increase of the coil to the estimatingly calculated temperature of the mass portion; and a current limiting device for limiting current flowing through the electric motor in accordance with the estimatingly calculated temperature of the coil.

19. A motor control apparatus according to claim 17, wherein the current limit device limits current flowing through the electric motor to a predetermined limit value or less, when the estimatingly calculated coil temperature exceeds a predetermined temperature.

20. A motor control apparatus according to claim 19, wherein when the current limit device limits the current flowing through the electric motor to the predetermined limit value or less, the current limit device gradually changes the limit value.

21. A motor control apparatus according to claim 17, wherein the current limit device limits current flowing through the electric motor to a limit value or less, the limit value decreasing as the estimatingly calculated temperature of the coil increases.

22. A motor control apparatus according to claim 17, wherein the electric motor is incorporated in a steering apparatus of a vehicle.

* * * * *